(12) United States Patent
Lee et al.

(10) Patent No.: US 8,538,479 B2
(45) Date of Patent: Sep. 17, 2013

(54) SHEATH TYPE ROUTER SHEATHEABLE TO MOBILE TERMINAL DEVICE

(75) Inventors: Gen-Kwo Lee, Taipei (TW); Kun-Li Chen, Taipei (TW); Julie Hsiau, Taipei (TW)

(73) Assignee: D-Link Corporation, Taipei (TW)

( * ) Notice: Subject to any disclaimer, the term of this patent is extended or adjusted under 35 U.S.C. 154(b) by 238 days.

(21) Appl. No.: 13/064,831

(22) Filed: Apr. 20, 2011

(65) Prior Publication Data

US 2012/0196652 A1  Aug. 2, 2012

(30) Foreign Application Priority Data

Jan. 31, 2011  (TW) .............................. 100103633 A (51) Int. Cl.
*H04B 1/38* (2006.01)

(52) U.S. Cl.
USPC ........ 455/557; 361/679.01; 29/601; 455/90.3

(58) Field of Classification Search
None
See application file for complete search history.

(56) References Cited

U.S. PATENT DOCUMENTS

| 8,253,518 | B2 * | 8/2012 | Lauder et al. | ................. 335/219 |
| 8,328,008 | B2 * | 12/2012 | Diebel et al. | ............... 206/45.24 |
| 2006/0285283 | A1 * | 12/2006 | Simonian et al. | ............. 361/679 |
| 2011/0090626 | A1 * | 4/2011 | Hoellwarth et al. | ...... 361/679.01 |
| 2012/0326003 | A1 * | 12/2012 | Solow et al. | ................... 248/688 |

* cited by examiner

*Primary Examiner* — German Viana Di Prisco
(74) *Attorney, Agent, or Firm* — Bacon & Thomas, PLLC (57) ABSTRACT

The present invention is to provide a sheath type router, which comprises a sheath, a printed circuit board, a battery and at least one antenna. The sheath is foldable and sheathable to a mobile terminal device. The printed circuit board and battery are enclosed in the sheath and electrically coupled together, wherein the printed circuit board includes a central processing unit, a wireless module, a communication module, a subscriber identity module port, at least one input/output port and a power switch, and the central processing unit is electrically coupled to the wireless module, communication module, ports and power switch respectively. When the power switch is turned ON, the printed circuit board is able to receive electric power from the battery, and the mobile terminal device fixed onto the sheath can connect to the wireless module through the antenna as well as connecting to a corresponding network through the communication module.

5 Claims, 7 Drawing Sheets

SHEATH TYPE ROUTER SHEATHEABLE TO MOBILE TERMINAL DEVICE

FIELD OF THE INVENTION

The present invention relates to a router, more particularly to a sheath type router, which is sheathable to a mobile terminal device and capable of connecting to several different types of networks, so as to allow the mobile terminal device to connect to other networks through the sheath type router and maintains the mobility of the mobile terminal device.

BACKGROUND OF THE INVENTION

As the micro computer industry advances, present mobile terminal devices (such as tablet PCs, PDAs and mobile phones) are designed with an increasingly smaller volume and increasingly more functions (such as the camera, calendar and game functions). Particularly, various mobile terminal devices allow users to browse and use information on networks via wireless connection, since related communication technologies are developed rapidly.

Most of the present mobile terminal devices use at least one network protocol (such as WiFi), but if the number of access points corresponding to the network protocol in some regional districts is too small, then users in these districts will be unable to log on a network through the mobile terminal device, and the convenient networking will be affected adversely. Although some manufacturers have designed various mobile terminal devices for different network protocols, yet the conventional mobile terminal devices still have existing problems. Firstly, not every user requires so many network protocols, and thus manufacturers have to design a mobile terminal device used for one particular network protocol and a mobile terminal device used for several different network protocols. For different circuit designs and productions, the production and design costs will be increased. Secondly, the mobile terminal devices with different network protocols generally come with a more complicated design of the internal circuits and the installation position of an antenna and require more components, which are unfavorable for the light, thin, short and compact design. The conventional mobile terminal devices not only require a higher level of difficulty on the circuit design, but also fail to meet user requirements. Thirdly, the mobile terminal devices with several network protocols are usually more expensive, and the higher selling price will cause a lower consumer's purchase intention and make it more difficult for manufacturers to cover their cost. Therefore, related manufacturers overcome the aforementioned problem by designing a leather cover sheathable to the mobile terminal device, wherein the mobile terminal device can be connected to networks of several different network protocols through the leather cover. To clearly disclose the aforementioned technical content, the mobile terminal device such as the WiFi IPod touch manufactured by Apple Inc. and the leather cover applied to such mobile terminal devices are used as examples for illustrating the present invention as follows.

Figure 1:
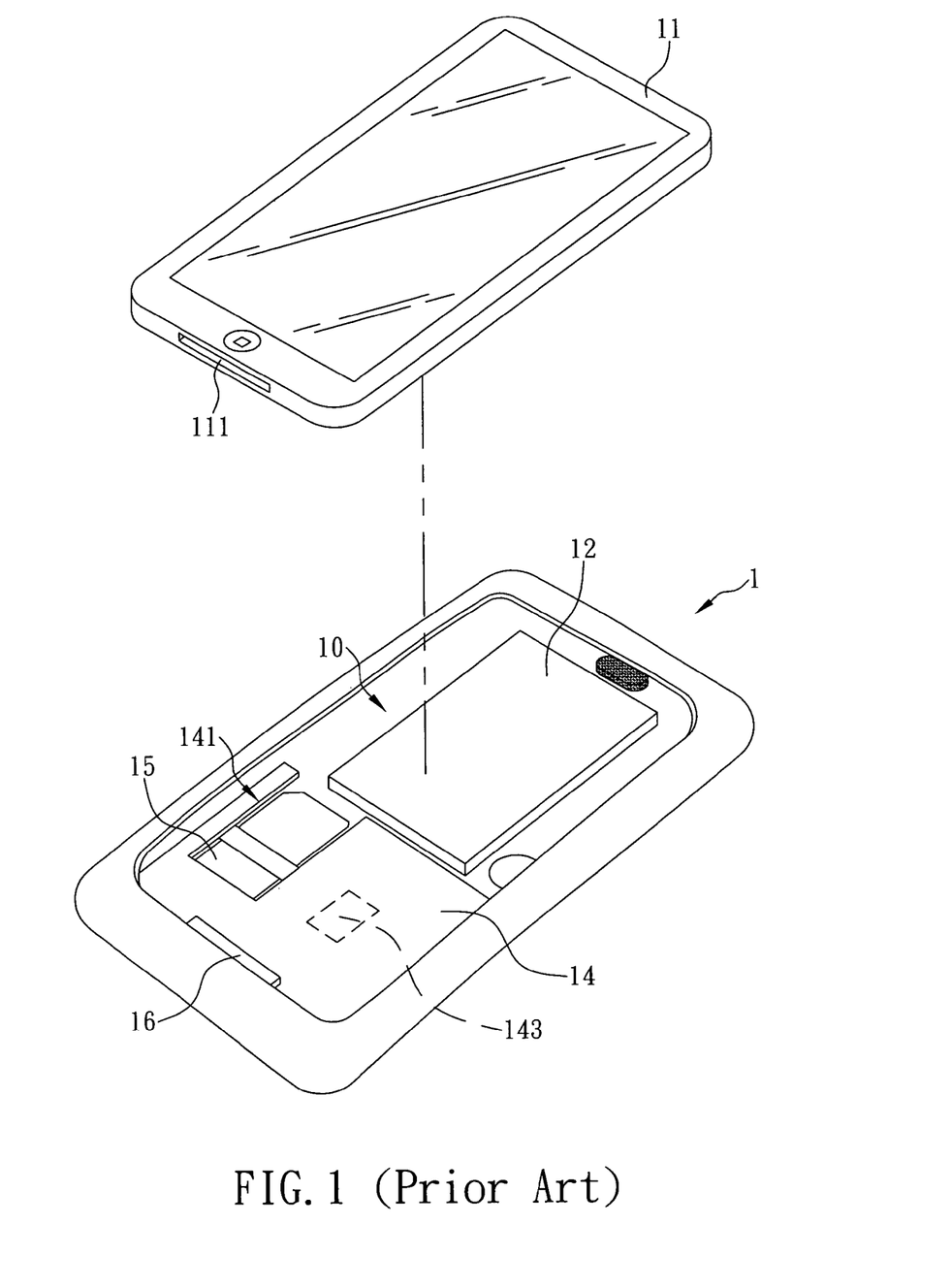
FIG. 1 is a schematic view of a conventional leather cover.

With reference to FIG. 1 for the aforementioned leather cover, the leather cover 1 includes a sheathing space 10 concavely formed on a side of the leather cover 1 and provided for receiving and accommodating a mobile terminal device 11, a battery 12, a printed circuit board 14, and a data interface 16 installed in the leather cover 1, wherein the battery 12 is electrically coupled to the printed circuit board 14 for transmitting current to the printed circuit board 14, and maintaining a normal operation of the printed circuit board 14. The printed circuit board 14 includes a subscriber identity module (SIM) slot 141 formed thereon and provided for inserting and connecting a SIM card 15 in order to read information from the SIM card 15. The printed circuit board 14 further includes a communication module 143 coupled to a communication network (such as GSM), and the data interface 16 can be inserted and connected to a port 111 of the mobile terminal device 11, such that the leather cover 1 and the mobile terminal device 11 can be electrically coupled to each other, and the mobile terminal device 11 can be connected to the communication network through the communication module 143. If users purchase the mobile terminal device 11 or the mobile terminal device 11 with the leather cover 1 according to their personal preference, manufacturers no longer require designing a mobile terminal device 11 with different network protocols, so as to reduce the design cost of the manufacturers significantly.

In FIG. 1, although the aforementioned leather cover 1 can be provided for connecting the mobile terminal device 11 to the communication network, yet its application still has many drawbacks. Firstly, the leather cover 1 is electrically coupled to the mobile terminal device 11 through the data interface 16, while the battery 12 and the SIM card 15 are assembled into the leather cover 1 and covered by the mobile terminal device 11. Therefore, if a user wants to change the battery 12 or the SIM card 15, the user has to plug and unplug the data interface 16, and the port 111 of the mobile terminal device 11 or the data interface 16 of the leather cover 1 may be damaged easily after a long time of use, and the user has to spend an additional maintenance fee or even has to buy a new one. Secondly, the leather cover 1 is electrically coupled to the mobile terminal device 11 through the data interface 16, such that one leather cover 1 can be used for a set of mobile terminal device 11. If the user needs not to use the mobile terminal device 11 currently, and others want to connect to a communication network through the leather cover 1, the mobile terminal device 11 disposed in the leather cover 1 must be removed first, and then another mobile terminal device 11 is inserted and connected. Obviously, such application is inconvenient to users who want to share the communication network of the leather cover 1. Finally, if the user wants to change to another different model of the mobile terminal device 11 and/or the model of the port 111 of the mobile terminal device 11, the leather cover 1 will be unable to electrically couple to the mobile terminal device 11 through the data interface 16, and the user has to buy another leather cover 1 in compliance with the model of the port 111. Obviously, the scope of applicability of the leather cover 1 is limited substantially.

Therefore, it is an important subject for related network manufacturers to design a feasible solution and develop a convenient product to overcome the aforementioned shortcomings of the prior art.

SUMMARY OF THE INVENTION

In view of the aforementioned shortcomings of the conventional leather cover applied in a mobile terminal device, the inventor of the present invention based on years of experience in the related industry to conduct extensive researches and experiments, and finally designed and developed a sheath type router sheathable to a mobile terminal device in accordance with the present invention to overcome the shortcomings of the prior art.

It is a primary objective of the present invention to provide a sheath type router sheathable to a mobile terminal device, wherein the function of the sheath type router capable of connecting to several different types of networks allows a mobile terminal device with a single function to connect to other networks through the sheath type router and maintains the mobility of the mobile terminal device. The sheath type router comprises a battery, a printed circuit board, a sheath and at least one antenna, wherein the printed circuit board is electrically coupled to the battery and enclosed into the sheath, and the printed circuit board includes a central processing unit (CPU), a wireless module (such as WiFi, Bluetooth and ZigBee, etc), a communication module (such as LTE, HSPA+, HSPUPA, HSDPA, EV-DO, CDMA, GPRS, WiFi, Ethernet and WiMAX, etc), a subscriber identity module (SIM) port, at least one input/output (I/O) port (such as a SD card port and a micro USB port) and a power switch, and the CPU is electrically coupled to the wireless module, the communication module and each of the ports for receiving signals transmitted from the wireless module, the communication module and/or each of the ports respectively, or transmitting signals to the wireless module, the communication module and/or each of the ports respectively. If the power switch is turned ON, the printed circuit board will be able to receive the electric power from the battery to maintain a normal-operation of components of the printed circuit board. In addition, the sheath is foldable and includes a first outer sheath and a second outer sheath, wherein an end of the first outer sheath is integrally coupled to an end of the second outer sheath, and a side of the first outer sheath can be folded and covered onto a side of the second outer sheath. The first outer sheath includes a sheathing portion disposed on a side of the first outer sheath for sheathing a mobile terminal device (such as a tablet PC, a PDA, and a mobile phone, etc), and the second outer sheath includes an antenna installed at a position away from the sheathing portion and an opening formed on a side of the second outer sheath and at a position corresponding to each of the ports for electrically coupling a corresponding SIM card or memory card to each of the ports. The outer sheath further includes a protrusion protruded from the outer sheath and at a position corresponding to the power switch, such that a user can press the power switch to switch the ON/OFF state of the power switch. After the user sheathes the sheath type router on the mobile terminal device, the power switch is turned ON, so that the mobile terminal device can connect to the wireless module of the sheath type router through a wireless connection as well as connecting to the corresponding network through the communication module of the sheath type router.

Another objective of the present invention is to set a wireless network access point or connect to a fix line, such that the terminal device near the sheath type router can be connected to a wireless module of the sheath type router and can be connected to a corresponding network of the communication module through the sheath type router, so that a user can simulate the sheath type router as a hotspot of wireless connections and open up the accessibility for friends or others to log on other networks via their mobile terminal devices.

DETAILED DESCRIPTION OF THE PREFERRED EMBODIMENTS

Figure 2A:
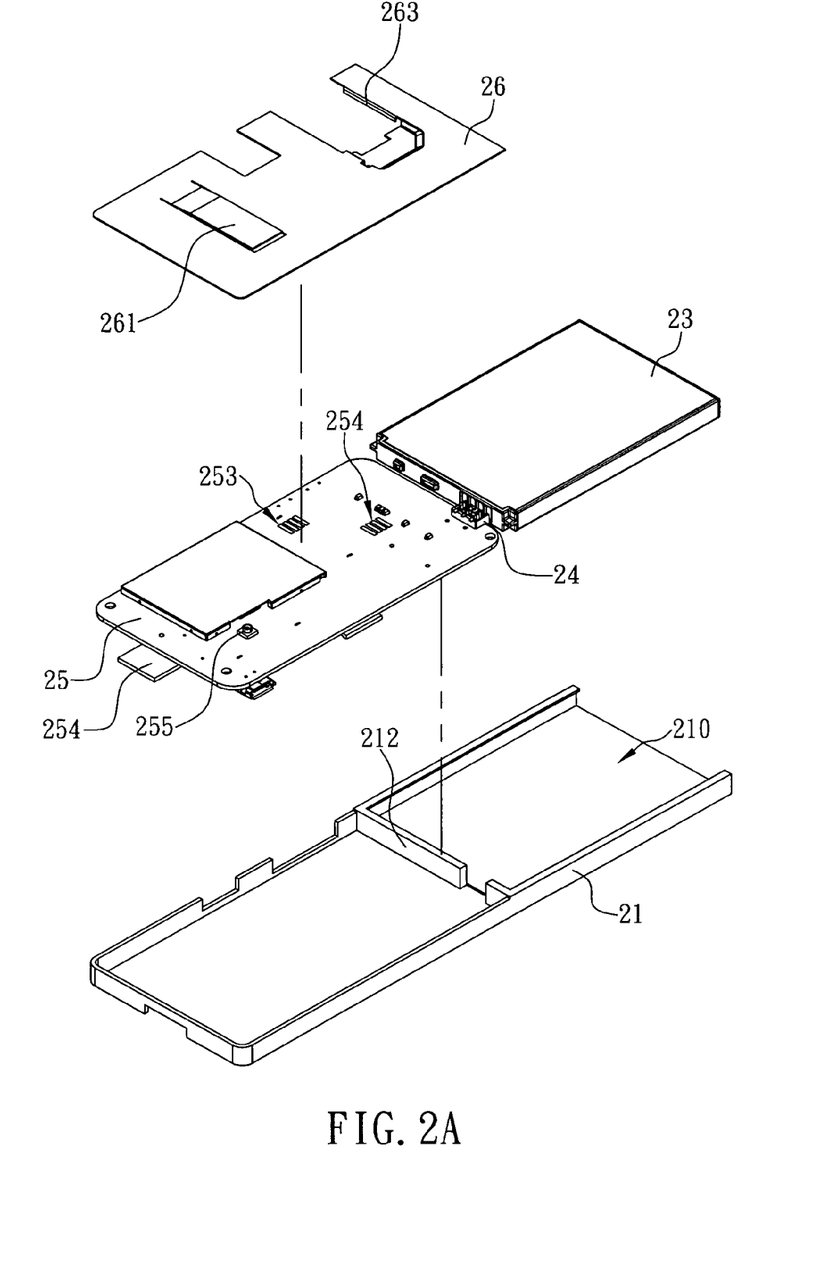
FIG. 2A is an exploded view showing a plastic base, a printed circuit board and a cover plate of the present invention.
Figure 2B:
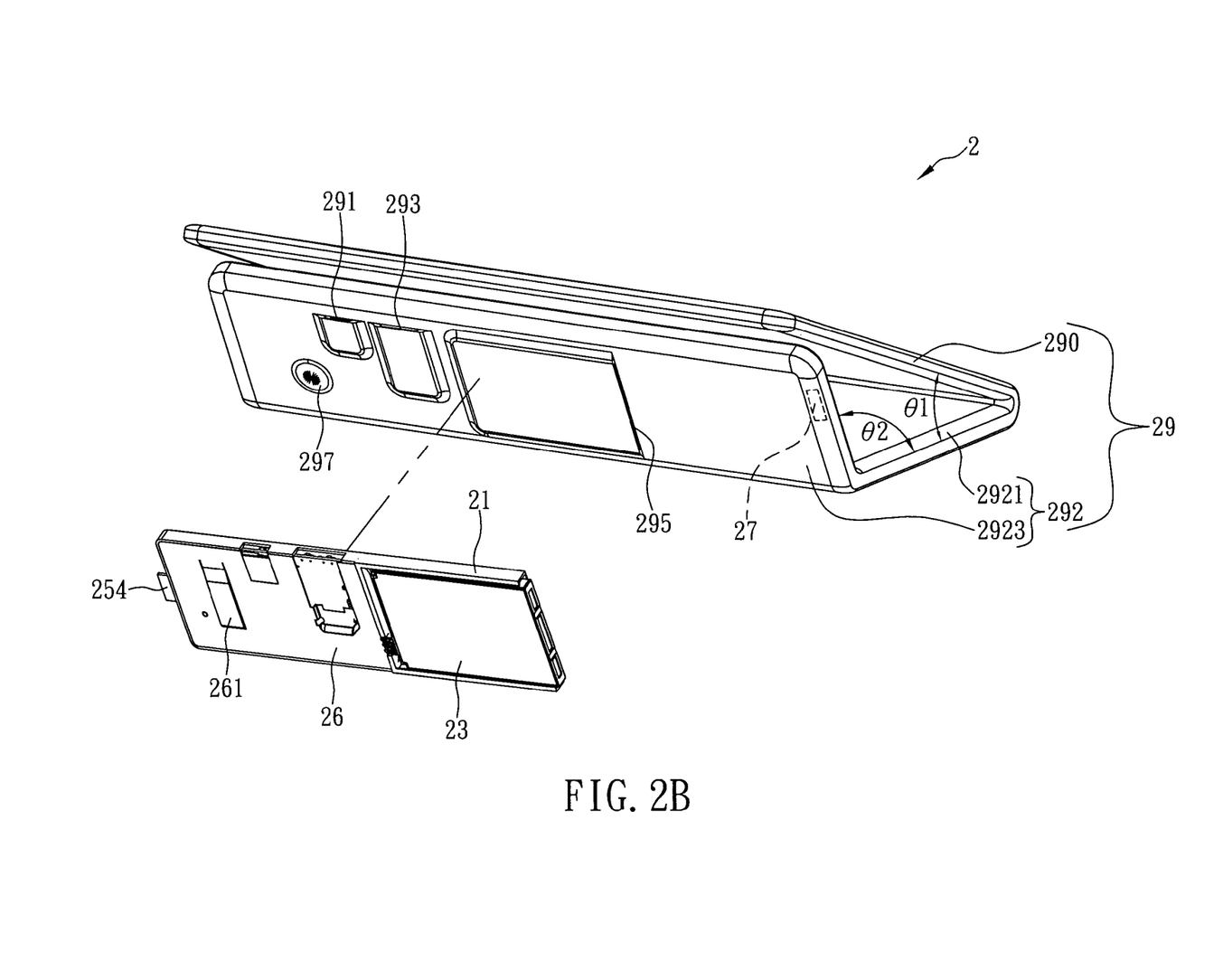
FIG. 2B is an exploded view showing an outer sheath with installed plastic base, printed circuit board and cover plate of the present invention.
Figure 2C:
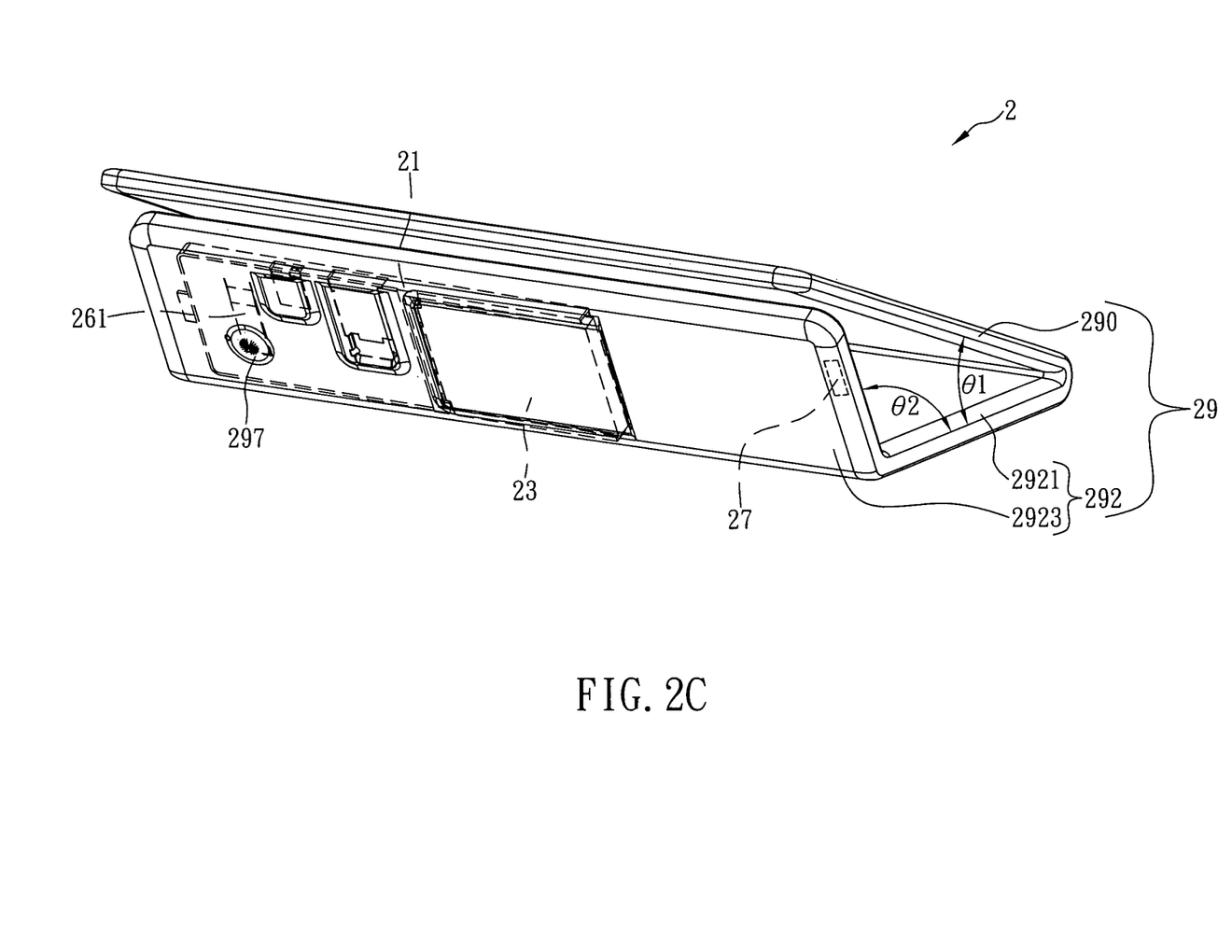
FIG. 2C is a schematic view of a sheath type router of the present invention.

With reference to FIGS. 2A-2C for a sheath type router sheathable to a mobile terminal device in accordance with a preferred embodiment of the present invention, the sheath type router 2 comprises a plastic base 21, a battery 23, a printed circuit board 25, a cover plate 26, at least one antenna 27 and a sheath 29, wherein a containing space 210 is defined on a side of the plastic base 21, and the plastic base 32 includes a baffle 212 for dividing the containing space 210 into two parts. It is noteworthy to point out that the plastic base 21 may not have the baffle 212 in other preferred embodiments of the present invention.

Figure 3:
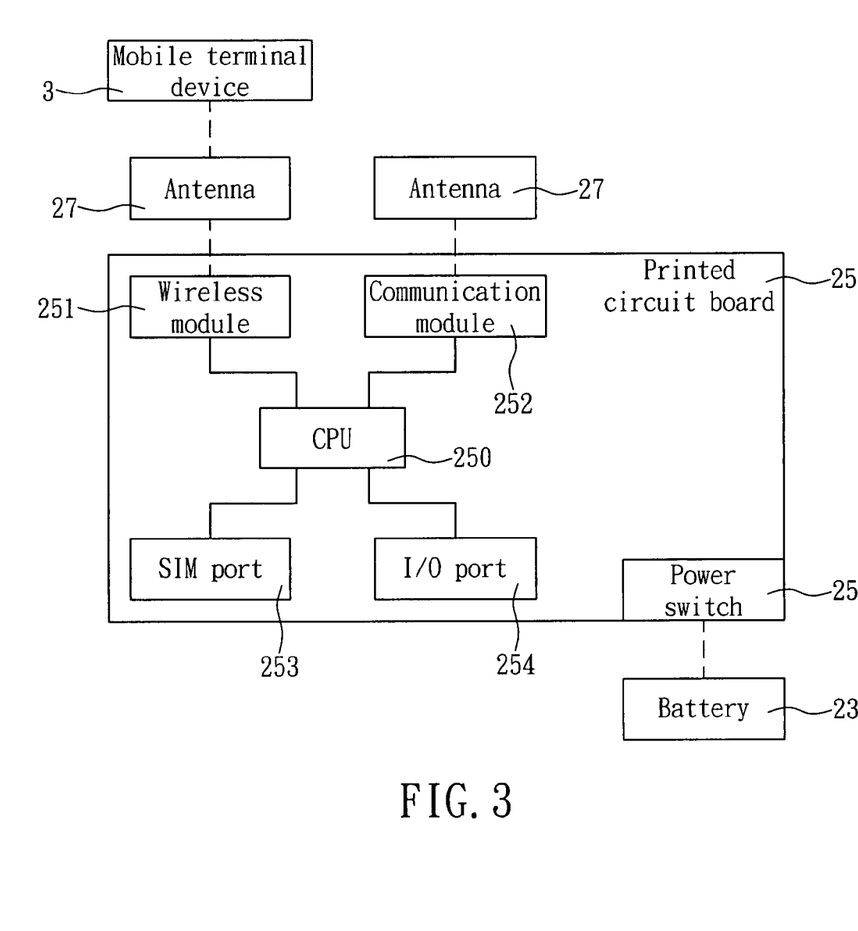
FIG. 3 is a schematic hardware block diagram of a sheath type router of the present invention.

In FIGS. 2A and 2B, the battery 23 is accommodated in a part of the containing space 210, and the printed circuit board 25 is accommodated in another part of the containing space 210, and the battery 23 and the printed circuit board 25 are electrically coupled to each other through a battery connector 24, such that the current of the battery 23 can be transmitted to the printed circuit board 25 to maintain a normal operation of each component of the printed circuit board 25. In FIG. 3, the printed circuit board 25 includes a central processing unit (CPU) 250, a wireless module 251, a communication module 252, a subscriber identity module (SIM) port 253, at least one input/output (I/O) port 254 and a power switch 255, wherein the power switch 255 can control whether or not to transmit the current of the battery 23 to the printed circuit board 25. If the power switch is situated at the ON state, the printed circuit board 25 can receive the current transmitted from the battery 23. In addition, the CPU 250 is electrically coupled to the wireless module 251, the communication module 252 and each of the ports 253, 254 for receiving signals from the wireless module 251, the communication module 252 and each of the ports 253, 254 or transmitting signals to the wireless module 251, the communication module 252 and each of the ports 253, 254. In this preferred embodiment, the wireless module 251 can adopt a WiFi, Bluetooth or ZigBee network protocol, and the communication module 252 can adopt a long term evolution (LTE), HSPA evolution (HSPA+), high speed uplink packet access (HSUPA), high speed downlink packet access (HSDPA), evolution-data optimized (EV-DO), code division multiple access (CDMA), general packet radio service (GPRS), WiFi, Ethernet or worldwide interoperability for microwave access (WiMAX) network protocol, and connect to a corresponding network via a wireless connection or connect to a corresponding cable network (such as ADSL, Cable, HTTB and FTTH) according to different network protocols, so that a mobile terminal device 3 (such as a tablet PC, a PDA or a mobile phone) can connect to the wireless module 251 of the sheath type router 2 through the wireless module of the mobile terminal device 3 and connect to the corresponding network of the communication module 252 through the communication module 252 of the sheath type router 2.

In FIGS. 2A and 3, the SIM port 253 is electrically coupled to a SIM card and provided for transmitting information stored in the SIM card to the CPU 250. In this preferred embodiment, there are two I/O ports 254, wherein one of the I/O ports 254 is a secure digital memory card (SD card) port, and the other one is a micro USB port, and the SD card port and the SIM port 253 are disposed on the same side of the printed circuit board 25, and the micro USB port is disposed on another side of the printed circuit board 25. However, manufacturers may change the quantity and type of the I/O port 254 according to the design requirement for different products in accordance with other preferred embodiments of the present invention. For example, only the micro USB port is provided; the cover plate 26 is covered onto the printed circuit board 25; an elastic plate 261 and at least one recession 263 are disposed thereon, and an end of the elastic plate 261 is coupled to the cover plate 26; and a free end of the elastic plate 261 is extended to the position of the power switch 255, and the free end of the elastic plate 261 is deformed and displaced after it is pressed by a user. If the free end is not pressed by the user, the power switch 255 will remain at its current state (such as an ON state or an OFF state), but if the free end is pressed by the user, then the power switch 255 will be triggered to change the current state (such as an ON or OFF state) of the power switch 255. Further, each of the recessions 263 corresponds to each of the ports 253, 254 respectively, and the cover plate 26 of this preferred embodiment includes two recessions 263 corresponding to the SIM port 253 and the I/O port 254 of the SD card port to define slots provided for inserting and connecting a SIM card and a SD card (not shown in the figure), and the SIM card and the SD card are fixed at predetermined positions for electrically conducting each of the corresponding ports 253, 254, so that the SIM card and the SD card will not be deviated or connected to other improper positions.

Figure 4:
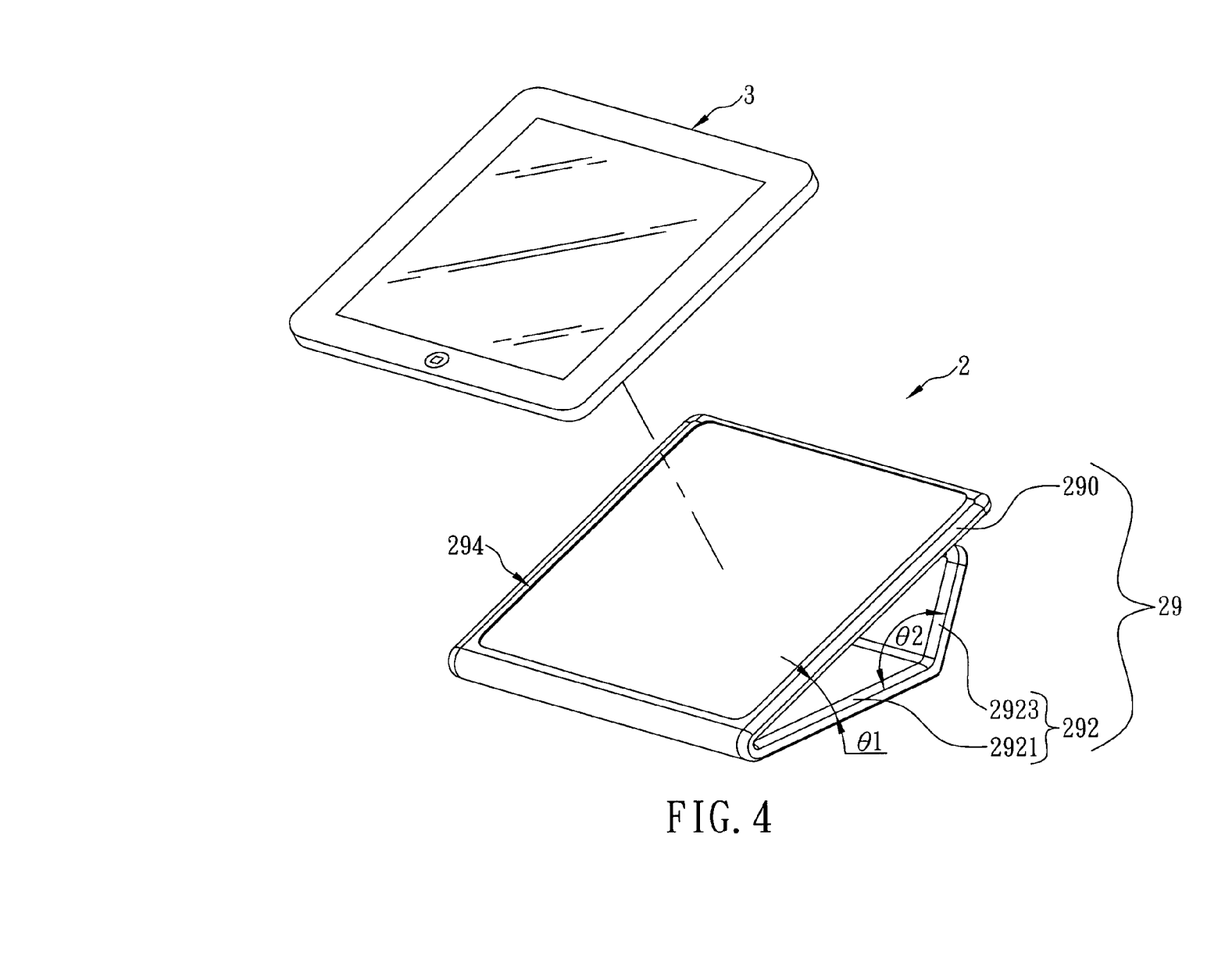
FIG. 4 is an exploded view of an outer sheath and a mobile terminal device of the present invention.
Figure 5:
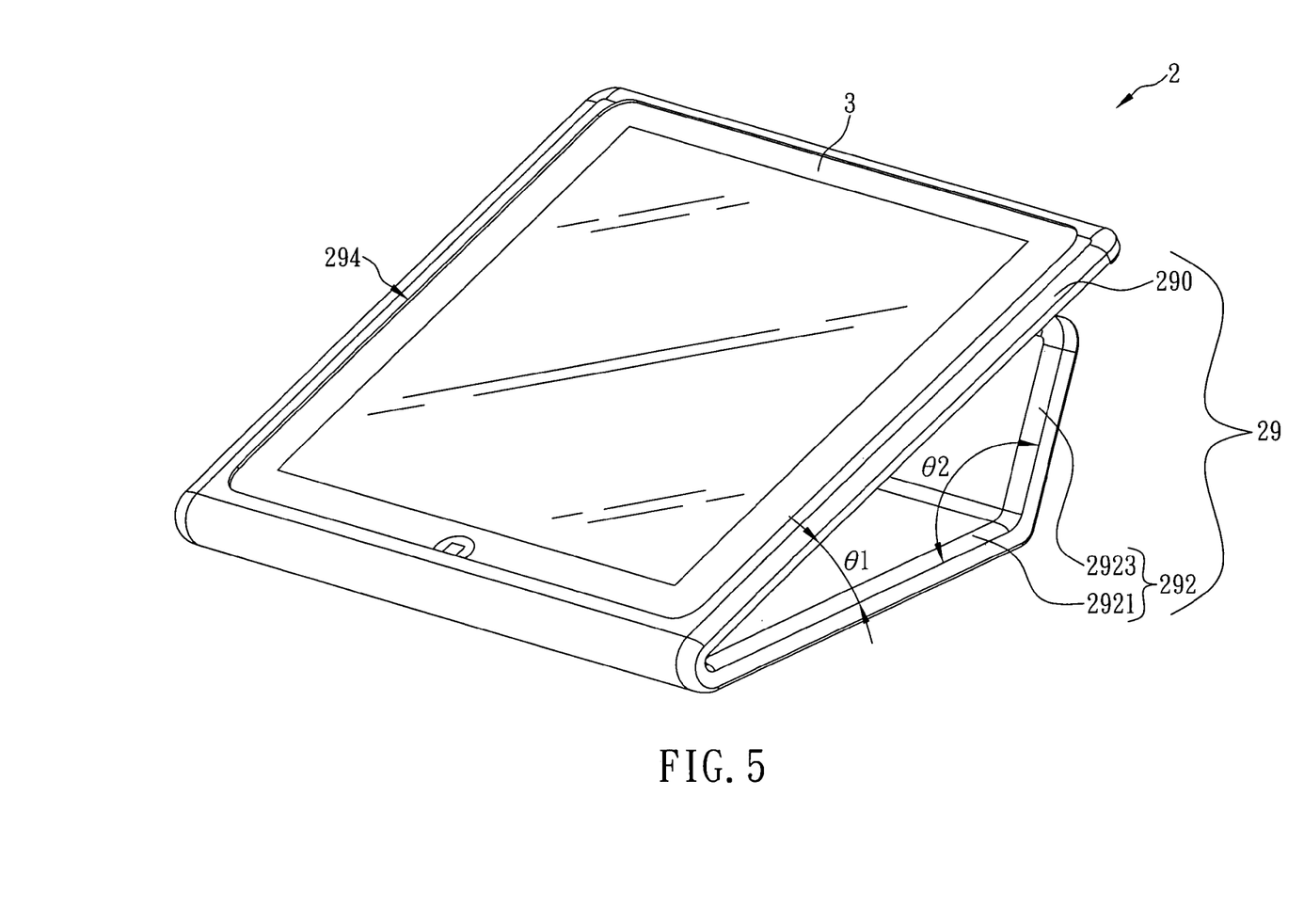
FIG. 5 is a perspective view of an outer sheath and a mobile terminal device of the present invention.

In FIG. 4, the sheath 29 is made of leather, plastic or silicone and comprises a first outer sheath 290 and a second outer sheath 292, wherein an end of the first outer sheath 290 and an end of the second outer sheath 292 are integrally coupled with each other, and a side of the first outer sheath 290 is folded and covered onto a side of the second outer sheath 292, and a sheathing portion 294 is disposed on a side of the first outer sheath 290 and sheathed on the mobile terminal device 3. In this preferred embodiment, when the mobile terminal device 3 is assembled to the sheath 29, the sheathing portion 294 can be attached onto the periphery of the mobile terminal device 3 (as shown in FIG. 5) to fix the mobile terminal device 3 into the sheath 29. However, the sheathing portion 294 in other preferred embodiments of the present invention can be an elastic ribbon or in any other equivalent form, as long as the sheathing portion 294 can fix the mobile terminal device 3 into the sheath 29. The first outer sheath 290 can be folded in a direction away from a side of the second outer sheath 292 to define a first angle θ1 with respect to the second outer sheath 292, such that manufactures simply need to install a flexible metal or a similar structure between the first outer sheath 290 and a second outer sheath 292 in order to adjust the first angle θ1 between the first outer sheath 290 and a second outer sheath 292 and facilitate users to view display contents of the mobile terminal device 3.

In FIGS. 2A~2C, the second outer sheath 292 comprises a connecting portion 2921 and an assembling portion 2923, and both corresponding ends of the connecting portion 2921 are respectively and integrally coupled to the assembling portion 2923 and the first outer sheath 290, and the assembling portion 2923 can be folded, and a second angle θ2 with respect to the connecting portion 2921 is defined, such that an end of the assembling portion 2923 away from the connecting portion 2921 can abut against another side of the first outer sheath 290, and users can change the second angle θ2 between the connecting portion 2921 and the assembling portion 2923 to adjust the first angle θ1 of the first outer sheath 290. In this preferred embodiment, the assembling portion 2923 is capable of enclosing the plastic base 21, the battery 23, the printed circuit board 25 and the cover plate 26, and a first opening 291 is formed on a side of the assembling portion 2923 and at a position corresponding to the SIM port 253, and a second opening 293 is formed at a position corresponding to the I/O port 254 of the SD card port and provided for users to insert and connect the SIM card and the SD card through each of the openings 291, 293 respectively, or remove the SIM card and the SD card from each of the openings 291, 293 respectively. In other preferred embodiments of the present invention, if the printed circuit board 25 does not come with an I/O port 254 for inserting and connecting a memory card, then only the first opening 291 is required. In addition, the assembling portion 2923 of the second outer sheath 292 has a third opening 295 formed at a position corresponding to the battery 23 and provided for users to change the battery 23 through the third opening 295. In preferred embodiments of the present invention, manufacturers can design the sheath type router 2 without providing the function of changing the battery 23, so that there will be no third opening 295 on the assembling portion 2923 of the second outer sheath 292. In other preferred embodiments of the present invention, the manufacturers can have a design without any connecting portion 2921 or assembling portion 2923 on the second outer sheath 292, and simply provide a second outer sheath 292 that cannot be folded, and the plastic base 21, the battery 23, the printed circuit board 25 and the cover plate 26 are installed in the second outer sheath 292.

In FIGS. 2A~2C, the second outer sheath 292 further includes a protrusion 297 protruded from a position corresponding to the elastic plate 261 and provided for users to press and deform the protrusion 297. In the meantime, the deformed protrusion 297 can press and deform a free end of the elastic plate 261 to switch the power switch 255 to an ON or OFF state, and produce a hand feel for users when the users press the power switch 255. If the protrusion 297 is not pressed by a user, the protrusion 297 possesses a resilient force to resume its original shape. In FIGS. 3 and 4, each of the antennas 27 is disposed in the assembling portion 2923 of the second outer sheath 292 and at a position away from the sheathing portion 294, and the wireless module 251 and the communication module 252 are electrically coupled to each other. Each of the antennas 27 can be prevented from being covered by the mobile terminal device 3 and affecting the effect of receiving or transmitting signals after the sheathing portion 294 is sheathed on the mobile terminal device 3. In FIGS. 2A-2C and 3, after a user sheathes the sheath type router 2 on the mobile terminal device 3, the user can press the protrusion 297 to turn on the power switch 255, such that the mobile terminal device 3 can be connected to the wireless module 251 of the sheath type router 2 via a wireless connection, and can also be connected to a corresponding network via the communication module 252 of the sheath type router 2. Since the sheath type router 2 can be set as a wireless network access point to simulate a hotspot of a wireless connection, therefore the user's terminal device can be connected to the corresponding network of the communication module 252 through the sheath type router 2. Obviously, the sheath type router 2 of the present invention has the following advantages:

(1) The sheath type router 2 can be installed onto a mobile terminal device 3 to provide a convenient way of carrying the router, and the mobile terminal device 3 has the capability of connecting to several different types of networks.

(2) The users can simulate the sheath type router 2 as a hotspot of wireless connections and open up the accessibility for friends or others to log on other networks via their mobile terminal devices. If the users do not use the mobile terminal device 3, they can just turn on the sheath type router 2 only and allow other terminal devices to connect to 2G/3G/4G communication networks from the sheath type router 2.

(3) The users can put the sheath type router 2 at home, connect the sheath type router 2 to a fix line such as ADSL, Cable, HTTB and FTTH, and use it as a general router, when they are not going out.

(4) The users can remove the corresponding SIM card, memory card (such as a SD card) or battery 23 from each of the openings 291, 293, 295 without damaging the structure of the sheath 29, and the users also need not to remove the mobile terminal device 3 first, so as to improve the convenience of using the router significantly.

(5) Since the sheath type router 2 is coupled to the mobile terminal device 3 through the wireless module 251, therefore when the users want to change the mobile terminal device 3 to another model, the users just need to apply the mobile terminal device 3 with a wireless module to the sheath type router 2 of the present invention, without the need of purchasing an additional sheath type router 2.

It is noteworthy to point out that the sheath type router 2 includes the plastic base 21 and the cover plate 26 in the preferred embodiment as shown in FIGS. 2A-2C, but manufacturers may not include the plastic base 21 and the cover plate 26 to reduce the production cost in other preferred embodiments of the present invention, and simply install the battery 23 and the printed circuit board 25 into the second outer sheath 292 of the sheath 29, and form each of the ports 253, 254 or each of the openings 291, 293, 295 of the battery 23 on the second outer sheath 292.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sheath type router sheathable to a mobile terminal device, comprising:
    a battery;
    a printed circuit board, electrically coupled to the battery, and including a central processing unit (CPU), a wireless module, a communication module, a subscriber identity module (SIM) port, at least one input/output port and a power switch, wherein the CPU is electrically coupled to the wireless module, the communication module and each of the ports, and when the power switch is situated at an ON state, the printed circuit board can receive an electric power transmitted from the battery;
    a sheath, comprising a first outer sheath and a second outer sheath, and an end of the first outer sheath being integrally coupled to an end of the second outer sheath, wherein a side of the first outer sheath is able to be folded and covered onto a side of the second outer sheath, a sheathing portion is formed on the side of the first outer sheath for fixing the mobile terminal device onto a side of the first outer sheath, the second outer sheath is capable of covering the printed circuit board and the battery and has a first opening formed on a side of the second outer sheath at a position corresponding to the subscriber identity module (SIM) port, and a protrusion is protruded from the second outer sheath at a position corresponding to the power switch, such that the protrusion can be pressed and deformed to switch the power switch to an ON or OFF state;
    at least one antenna, installed in the second outer sheath at a position away from the sheathing portion, and electrically coupled to the wireless module and the communication module;
    a plastic base, enclosed into the second outer sheath and having a containing space concavely formed on a side of the plastic base, wherein the containing space is provided for accommodating the battery and the printed circuit board; and
    a cover plate, enclosed into the second outer sheath and covered onto the printed circuit board, and having at least one recession and an elastic plate, wherein each of the recessions corresponds to each of the ports respectively to form a slot, an end of the elastic plate is coupled to the cover plate, and a free end of the elastic plate is extended to a position corresponding to the power switch, such that when the free end is pressed by a deformed protrusion, the power switch is switched to an ON or OFF state.

2. The sheath type router of claim 1, wherein the input/output port and the subscriber identity module (SIM) port are disposed on the same side of the printed circuit board, and the second outer sheath includes a second opening formed at a position corresponding to the input/output port.

3. The sheath type router of claim 2, wherein the second outer sheath includes a third opening formed at a position corresponding to the battery.

4. The sheath type router of claim 3, wherein the wireless module is a WiFi, Bluetooth or Zigbee network protocol.

5. The sheath type router of claim 3, wherein the communication module is a LTE, HSPA+, HSPUPA, HSDPA, EV-DO, CDMA, GPRS, WiFi, Ethernet or WiMAX network protocol.

* * * * *